Nov. 10, 1953   W. G. BUTSCH   2,658,794
ROOF CONSTRUCTION FOR TRUCKS OR TRAILERS
Filed June 10, 1952   3 Sheets-Sheet 1
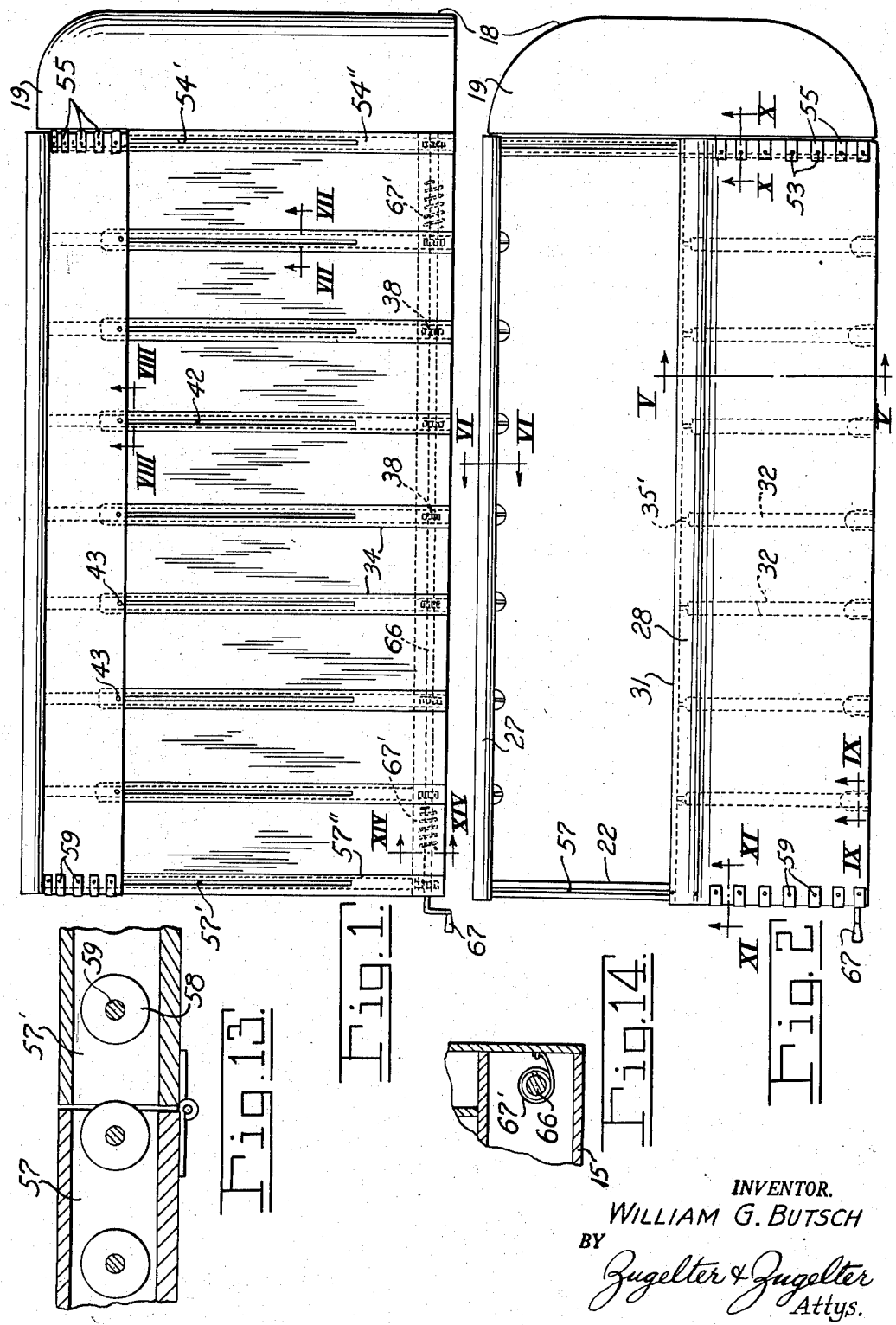
INVENTOR.
WILLIAM G. BUTSCH
BY
Zugelter & Zugelter
Attys.

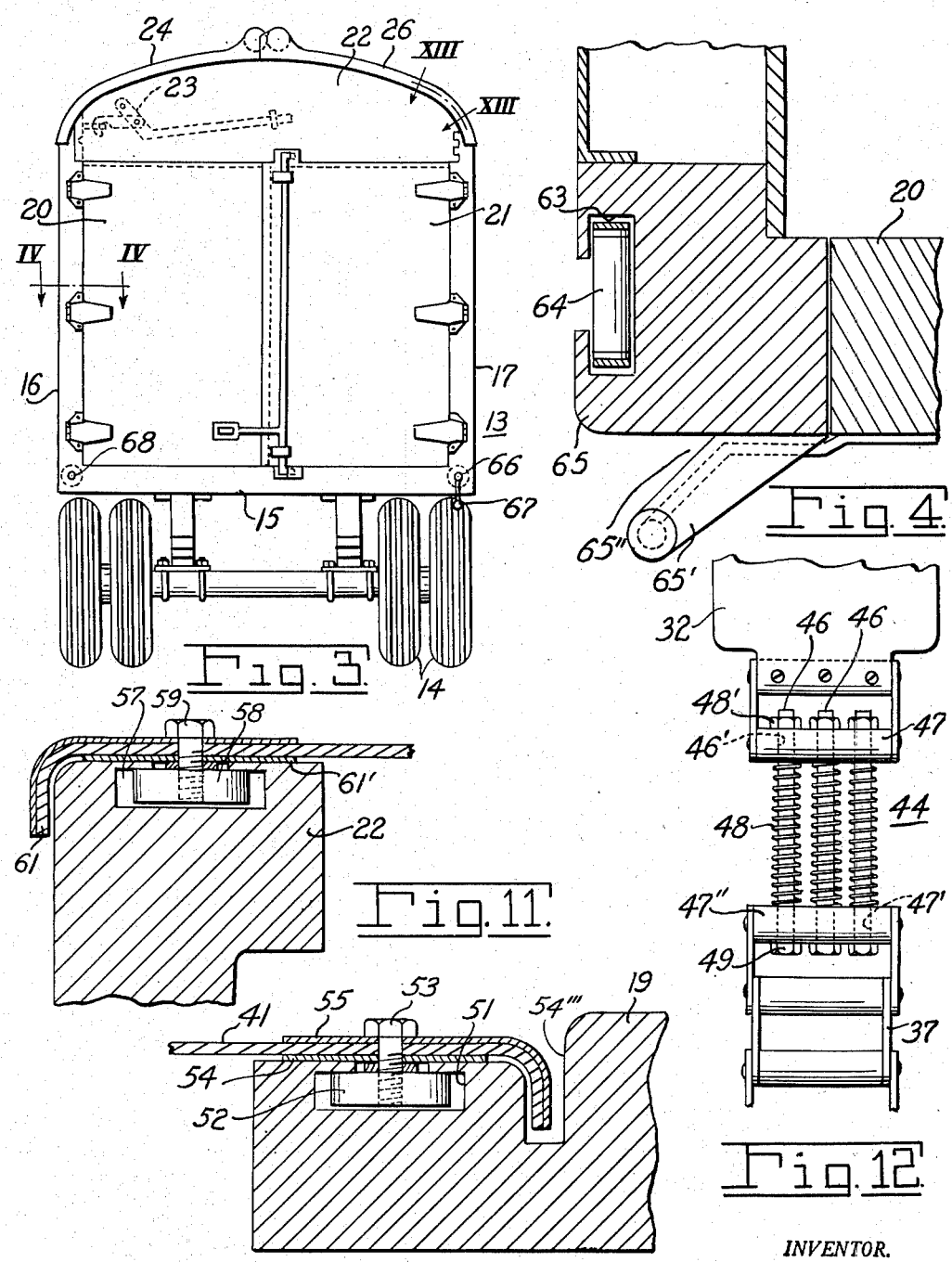

Nov. 10, 1953          W. G. BUTSCH          2,658,794
ROOF CONSTRUCTION FOR TRUCKS OR TRAILERS
Filed June 10, 1952                          3 Sheets-Sheet 3
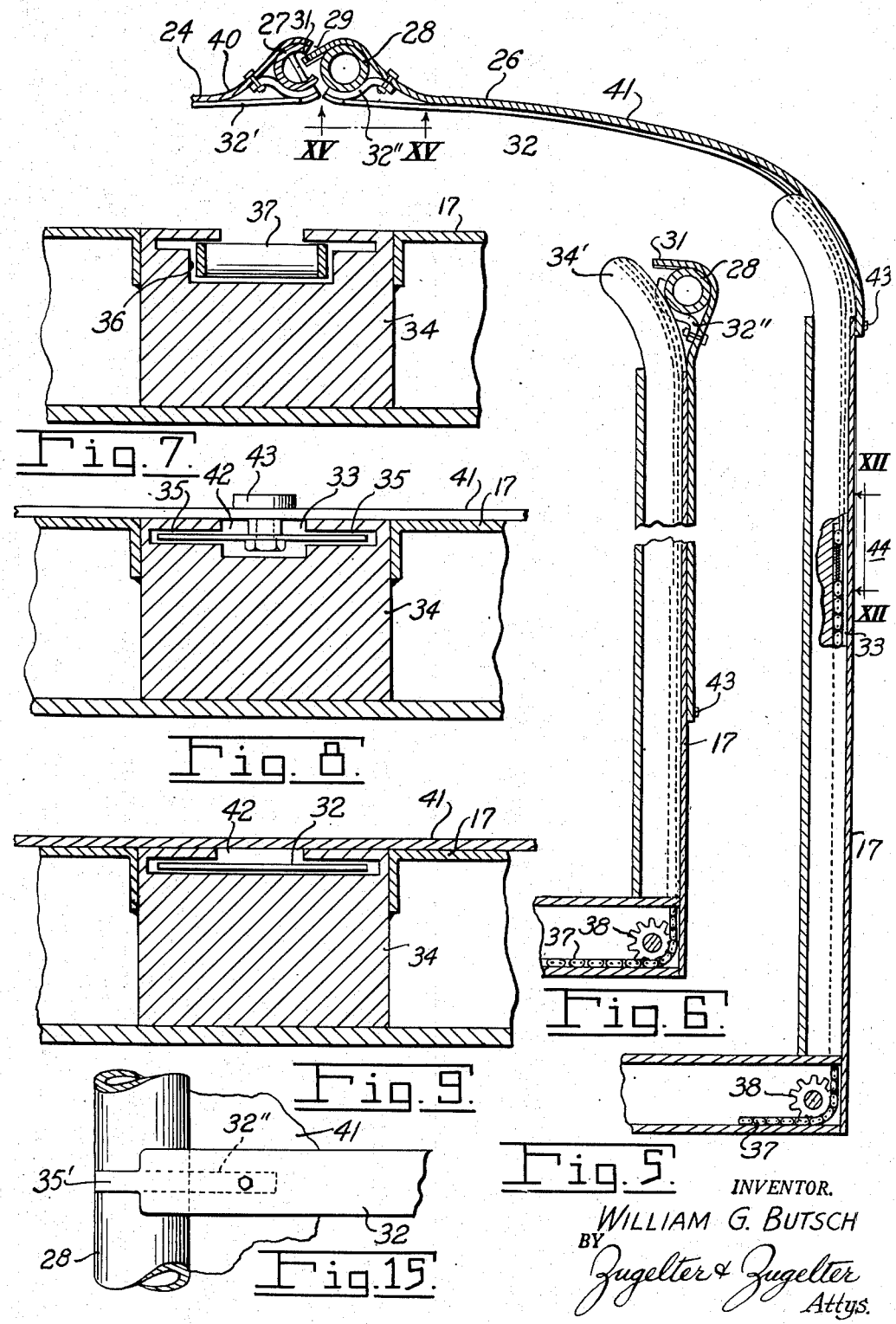
INVENTOR.
WILLIAM G. BUTSCH
BY
Zugelter & Zugelter
Attys.

Patented Nov. 10, 1953

2,658,794

UNITED STATES PATENT OFFICE 2,658,794

ROOF CONSTRUCTION FOR TRUCKS OR TRAILERS

William G. Butsch, Fort Thomas, Ky.

Application June 10, 1952, Serial No. 292,699

5 Claims. (Cl. 296—100)

This invention relates to a truck or trailer-truck body having a top or roof which can be opened and closed as required. This invention represents an impovement over the truck body shown in my Patent No. 2,591,050, issued March 1, 1952.

An object of this invention is to provide a roof for a truck body or the like which can be readily opened wide so that the truck may be readily loaded and unloaded from above.

A further object of this invention is to provide a roof for a truck body that shall be so constructed that the structural elements thereof will be disposed along the outside of the walls of the truck body, when the roof is open.

A further object of this invention is to provide a cover or top for a truck having supports which are housed in the side walls of the truck when the roof is open.

A further object of this invention is to provide spring support members for supporting the top or roof of a truck body.

The above and other objects and features of this invention will in part be obvious and will in part be apparent from the following detailed description and the drawings, in which:

Figure 1 is a view in side elevation showing a truck body constructed in accordance with an embodiment of this invention, the chassis of the truck being omitted;

Fig. 2 is a top plan view of the truck body showing one-half the roof thereof in open position;

Fig. 3 is a view of the truck in rear elevation;

Fig. 4 is an enlarged view in section taken along a line IV—IV in Fig. 3, showing details of one of the door hinges of the truck body;

Fig. 5 is an enlarged fragmentary view in transverse section taken along a line V—V in Fig. 2 showing details of a side wall and of one of the roof sections and a portion of the other roof section of the truck body, the roof sections being shown in closed position;

Fig. 6 is a view in section taken along a line VI—VI of Fig. 2 showing one roof section in open position;

Figs. 7 and 8 are views in section taken along lines VII—VII, and VIII—VIII, respectively, of Fig. 1;

Figs. 9, 10, and 11 are views in section taken respectively on lines IX—IX, X—X, and XI—XI of Fig. 2;

Fig. 12 is a fragmentary view in side elevation taken in the direction of the line XII—XII in Fig. 5;

Fig. 13 is a view in section taken along a line XIII—XIII in Fig. 3;

Fig. 14 is a view in section taken along a line XIV—XIV in Fig. 1; and

Fig. 15 is a fragmentary view in bottom plan taken in the direction of the line XV—XV in Fig. 5.

In the following detailed description and the drawings, like reference characters indicate like parts.

As shown in Fig. 3, a trailer truck body 13 is mounted on wheels 14 and includes a floor 15, side walls 16 and 17, and a front wall 18 (Fig. 2) which may be constructed in a conventional manner. A part of the front end of the body 13 is covered by a solid top 19. At the rear of the body, doors 20 and 21 (Fig. 3) are hinged to side walls 16 and 17, respectively. The upper edges of the doors 20 and 21 terminate below the top of the trailer body. Above the doors is located a header panel 22. Panel 22 is hinged to side wall 17, and, when closed, is tightly latched by means of latching mechanism 23.

The roof of the trailer truck is formed in two sections 24 and 26 either or both of which may be opened and closed. When the roof sections are closed, they meet along the center line of the truck body. Roof section 24 is provided with a ridge pole 27, and roof section 26 is provided with a ridge pole 28. When the roof sections are closed, the ridge poles meet, as shown in Fig. 5. The ridge pole 27 is provided with a slot 29, while the ridge pole 28 is provided with a tongue 31. Tongue 31 extends into slot 29 when the roof sections are closed, to form a trap for any rain water or other extraneous matter which may be caught between the roof sections. Ridge pole 27 forms a trough, as shown, along which the water is discharged.

The ridge pole 28 is attached to the upper and inner ends of a plurality of spaced elongated plate springs 32. Each spring 32 spans the space between ridge pole 28 and side wall 17. Ridge pole 27 it attached to similar plate springs 32'. Since the springs 32' of roof section 24 are similar in construction and operation to the springs 32 of roof section 26, only the springs of roof section 26 will be described in detail. The upper and inner end of each plate spring 32 is attached to a spacer 32" which, in turn is attached to ridge pole 28. The lower end of plate spring 32 is received in a track 33 in a stud 34 of side wall 17. Details of construction of the tracks are shown in Figs. 7, 8, and 9. As shown in Fig. 8, track 33 includes spring guiding slots 35 in which spring 32 is received. The upper portion 34' of each stud 34 is curved toward the opposite side wall as indicated in Fig. 5, and the spring guiding tracks curve with the upper portions of the studs, so that where each spring leaves its tracks, the spring is directed upwardly and toward the opposite side wall as indicated in Fig. 5. When the springs are in roof closed position, as shown in Fig. 5, the springs are arched upwardly for strength. When the springs are in roof open position, as shown in Fig. 6, the spacer 32'' of each spring extends into track 33. As shown in Fig. 9, the side of track 33 is open, as indicated at 35, and a tip portion 35' (Fig. 15) of spring 32 projects therethrough.

The lower portion of each track 33, as shown in Fig. 7, is provided with an enlarged portion 36 in which a compression loadable chain 37 is received. Chain 37 can be raised to advance spring 32 up its track and can be drawn down the track to draw spring 32 down the track. At the bottom of track 33, chain 37 meshes with a sprocket wheel 38 (Fig. 5). When sprocket wheel 38 is turned, chain 37 is advanced up or down the track for driving the spring 32 up or down.

Roof sections 24 and 26 are covered by sheet or skin members 40 and 41, respectively, of flexible material, such as canvas, stainless steel, or other appropriate flexible material. The upper and inner edge of skin member 41 is attached to ridge pole 28, while the outer and lower edge of member 41 is attached to the lower ends of the plate springs of roof section 26. As shown in Figs. 8 and 9, the outer face of track 33 is slotted as indicated at 42, and each spring 32 is attached to the outer and lower edge of roof member 41 by means of a bolt 43, as shown in Fig. 8. As the springs 32 are raised or lowered, roof skin member 41 is raised or lowered therewith. Roof skin member 40 is similarly attached to ridge pole 27 and springs 32' so that roof skin member 40 is raised and lowered with springs 32'.

Each chain is attached to the spring actuated thereby by means of a resilient linkage 44, as indicated in Fig. 12. The resilient linkage includes a plurality of bolts 46. One end of each bolt 46 is slidably received in an opening 46' in a cross member 47 linked to the lower and outer end of one of the springs 32. The other end of each bolt is slidably received in an opening 47' of a terminal link 47'' of one of the chains 37. Each bolt 46 carries a compression coil spring 48 which urges the chain 37 and the plate spring 32 apart. A nut 48' and a bolt head 49 on each bolt prevent separation of the chain from the plate spring 32 at the resilient linkage.

The forward end of roof section 26 and ridge pole 28 are guided by a track 51 in the solid top 19 of front wall 18, as indicated in Fig. 10. Track 51 acts as a slideway in which a plurality of sliding members or buttons 52 are received. Each member 52 is attached to the leading edge of roof skin member 41 by means of a bolt 53 or the like. The sliding members 52 are connected together by a flat spring member 54. Member 54 slides on top of solid top 19. The lower and outer end of spring member 54 is attached to a compression loadable chain mounted in a track 54' (Fig. 1) in a stud 54'' at the front of side wall 17. As indicated in Fig. 10, a slot 54''' is provided in solid top 19, and the forward edge of roof skin member 41 is turned into slot 54''' so that slot 54''' tends to catch any rain or the like which may be trapped at the front of roof section 26. The forward edge is additionally reinforced by a plurality of L-shaped clips 55. Each clip 55 is mounted on one of the bolts 53 and extends over the edge of roof sheet 41, as shown in Fig. 10.

The rear edge of roof section 26 and ridge pole 28 are supported and guided by a track 57 (Figs. 2, 11, and 13) provided in header panel 22, and a co-operating track 57' in a stud 57'' at the rear end of side wall 17. Track 57 serves to guide a plurality of sliding members or buttons 58. Each sliding member 58 is attached to the rear edge of roof section 26 by means of a bolt 59 or the like. The trailing edge of roof section 26 is curved over the top of header panel 22, as indicated at 61 in Fig. 11, to discharge any rain or the like which may collect on roof section 26 over the rear of the truck body. The sliding members 58 are connected together by a flat spring metal member 61'. Member 61' slides on top of header panel 22 and on the outside of stud 57''. The lower end of spring member 61' is attached to a compression loadable spring in track 57'.

Heretofore, the structure of roof section 26 has been discussed in detail. Roof section 24 is similar in construction and operates in a similar manner. Details of a track 63 and a compression loadable chain 64 mounted therein for actuating the rear end of roof section 24 are shown in Fig. 4. Track 64 is mounted in a stud 65 at the rear of the body, as shown in Fig. 4. As shown in Fig. 4, each hinge 65' of truck door 20 is attached to stud 65 inboard of the outer edge to leave a space 65'' in which the trailing edge 61 (Fig. 11) of roof section 24 can be received when the roof section 24 is open.

Each of the chains utilized for raising or lowering roof section 26 is in mesh with one of the sprocket wheels 38 as indicated most clearly in Figs. 2, 5 and 6. The sprocket wheels 38 are all mounted on a shaft 66 so that the sprocket wheels 38 can turn together. Shaft 66 carries a crank 67, and the shaft 66 and the sprocket wheels 38 carried thereby are all turned in unison when crank 67 is turned. As shown in Fig. 14, shaft 66 is loaded by means of springs 67' to balance the weight of the chains and roof section 26. The chains which raise and lower roof section 24 similarly are actuated when a shaft 68 (Fig. 3) is turned.

When the roof sections are closed, the ridge poles abut along the center line of the truck body and form a rain-catching trap between the roof sections. When it is desired to load or unload the truck body, the roof sections may be opened to the position shown in Fig. 6, whereupon the rear doors 20 and 21 and the header 22 may be opened so that the entire top and rear of truck body are open and the truck body may be loaded from above and from the rear.

The truck body described above and shown in the drawings is designed as a trailer truck. However, it is to be understood that the same type of body could be used on a self-propelled truck or other vehicle.

The roof sections can be opened or closed without difficulty by one man standing on the ground at the rear of the body and without leaving the ground. If desired, the sprocket carrying shafts 67 and 68 may be connected to an appropriate power takeoff for power opening and closing of the roof sections.

The trailer truck body illustrated in the drawings and described above is subject to structural modification, without departing from the spirit and scope of the appended claims.

Having described my invention, what I claim as new and desire to secure by Letters Patent is:

1. A truck body of the closed type provided with a roof divided lengthwise at the ridge pole into two sections, each section of said roof comprising a plurality of elongated plate springs adapted to extend transversely of the body from one sidewall to the ridge pole position of the roof and being spaced lengthwise of the body, a ridge pole for each section, the ridge pole ends of the springs of each section being secured to their associated ridge pole, the wall ends of the springs of each section being arranged to slide vertically in the associated sidewall, means for moving the springs of each section vertically in either direction whereby the ridge pole thereof can be moved from a position at the ridge pole position of the roof to a point adjacent the top of the side wall, and a flexible cover for each of said sections secured to the ridge pole and to the springs thereof, whereby the cover moves with the springs to or from closed roof position.

2. A truck body having a floor, side walls, front and rear walls, and a sectional roof that can be opened and closed, said roof comprising a pair of ridge poles, a plurality of elongated plate spring members attached to each ridge pole, each of said spring members being received in a track in one of the side walls, the ridge poles being advanceable between a roof open position adjacent the side walls in which the springs are substantially fully housed in the tracks and a roof closed position in which the ridge poles are in engagement and end portions of the springs are in the tracks with the springs spanning the spaces between the side walls and the ridge poles, a flexible sheet roof member having an edge attached to each ridge pole and overlying the springs to cover the truck body when the ridge poles are in engagement, and means for drawing the roof members into substantial alignment with the sidewalls when the ridge poles are in open position.

3. A roof covering for a truck body having side walls, said roof covering comprising a plurality of spaced parallel tracks extending up and down one of said side walls, each of said tracks terminating in a section directed upwardly and toward the other side wall, an elongated plate spring member slidably received in each of said tracks, a ridge pole connecting the upper ends of said spring members, a flexible sheet roof member overlying the springs, said sheet roof member having one edge attached to the ridge pole, and means for advancing the springs and ridge pole between a roof closed position in which the roof member covers the truck body and a roof open position in which the springs are substantially fully housed in the tracks and the roof member is in alignment with said one of the side walls.

4. A roof covering for a truck body in accordance with claim 3, characterized by the fact that the means for raising and lowering each spring is a compression loadable chain attached to the lower end of the spring and traveling in the track of the spring below the spring.

5. A roof covering for a truck body in accordance with claim 3, characterized by the fact that each track opens outwardly and that a fastener is provided connecting the edge of the roof member remote from the ridge pole to each spring, the fasteners projecting through the openings in the tracks, whereby the roof member is held substantially taut and is raised and lowered with the springs.

WILLIAM G. BUTSCH.

References Cited in the file of this patent

UNITED STATES PATENTS

| Number | Name | Date |
|---|---|---|
| 1,231,874 | Gallanore et al. | July 3, 1917 |
| 2,346,554 | Clark | Apr. 11, 1944 |
| 2,562,300 | Dingman | July 31, 1951 |

FOREIGN PATENTS

| Number | Country | Date |
|---|---|---|
| 486,120 | Great Britain | May 31, 1938 |